Feb. 14, 1967 H. T. FULLAM ETAL 3,304,248
PROCESS FOR THE PRODUCTION OF NITROGEN FLUORIDES
Filed July 24, 1963
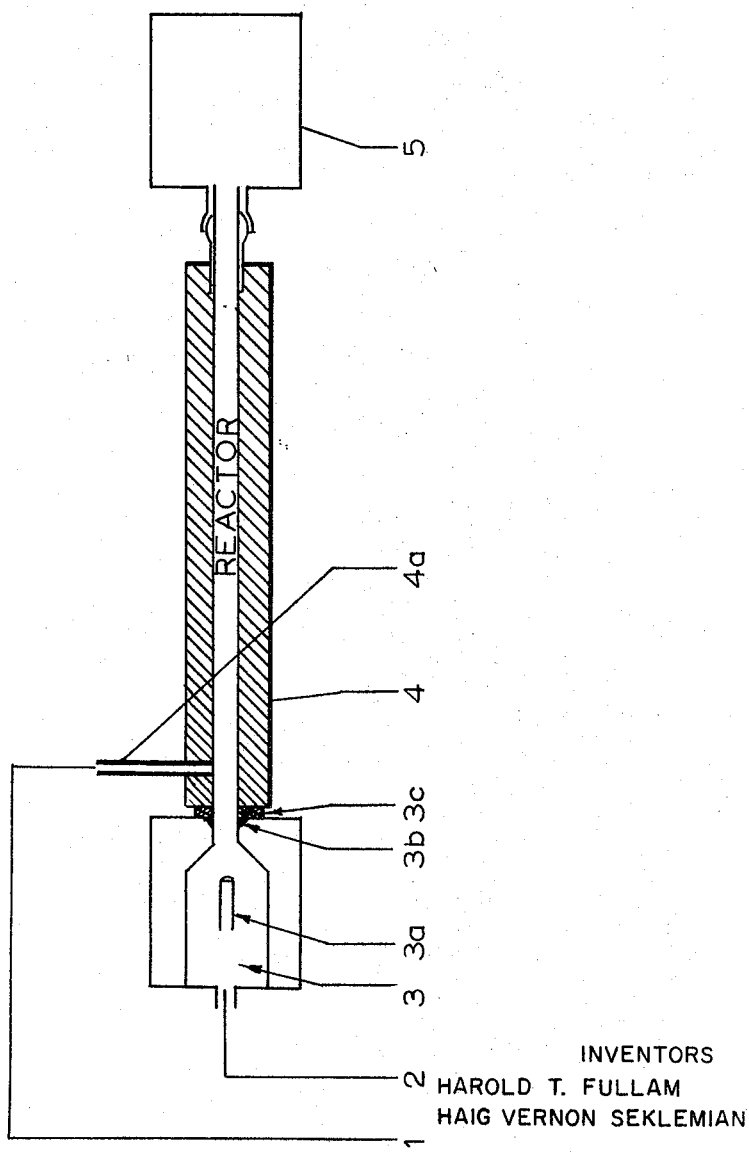
INVENTORS
HAROLD T. FULLAM
HAIG VERNON SEKLEMIAN 3,304,248
PROCESS FOR THE PRODUCTION OF
NITROGEN FLUORIDES
Harold T. Fullam, Oakland, and Haig Vernon Seklemian, Covina, Calif., assignors to Stauffer Chemical Company, New York, N.Y., a corporation of Delaware
Filed July 24, 1963, Ser. No. 297,255
3 Claims. (Cl. 204—178)

This invention relates to a new and novel process for preparing nitrogen fluorides. More specifically, this invention relates to the preparation of nitrogen trifluoride, $NF_3$, and tetrafluorohydrazine, $N_2F_4$.

Tetrafluorohydrazine, $N_2F_4$, is also called dinitrogen tetrafluoride. It is a colorless gas that boils at about minus 73° C. Dinitrogen tetrafluoride has been previously prepared in several ways, each of which required the use of nitrogen trifluoride. Dinitrogen tetrafluoride is of interest as a valuable chemical intermediate, e.g., as a binary fluoride it is suitable for reaction with carbon at very high temperatures to yield fluorocarbons. The use of this compound as a high energy oxidizer for propellants also has been proposed.

Nitrogen trifluoride, $NF_3$, is normally a colorless gas and has a boiling point of about minus 129° C. and a melting point of about minus 208° C. Nitrogen trifluoride is useful as an intermediate in the preparation of fluorocarbons, especially fluoroolefins by the process described in U.S. 2,709,186. Nitrogen trifluoride also is useful as a polymerization catalyst for the preparation of fluorocarbon resins from fluorine-containing olefins.

The development of the above mentioned nitrogen fluorides as commercially available materials has been hindered by the lack of an economical method of preparation. Previously, nitrogen trifluoride has been prepared by the reaction of ammonia and elemental fluorine and by the electrolysis of selected molten fluorides. These processes yield nitrogen trifluoride in admixture with many by-products from which it is difficult to isolate the trifluoride in pure form. Therefore, a process for obtaining solely nitrogen trifluoride and dinitrogen tetrafluoride from such elemental starting materials as fluorine and nitrogen is a desirable achievement.

It has now been found that nitrogen trifluoride and dinitrogen tetrafluoride can be prepared by a novel process from the elements fluorine and nitrogen. The process comprises passing gaseous nitrogen through a plasma arc at a temperature of at least 1000° C. and introducing gaseous elemental fluorine into the post arc region as near the anode as possible. This position of injection of the fluorine gives the longest reaction time in the plasma cone in the reactor. The exit gases are quenched to a temperature below 25° C. within a maximum of $\frac{1}{20}$ second.

The starting materials for use in this process are elemental nitrogen and elemental fluorine obtainable from commercial sources. The production of the plasma can take place in a number of ways: shock, spark discharge, chemical reaction of high specific energy, nuclear reaction or, as in the case of the present invention, by means of an arc discharge. The method of activation, the plasma arc, consists essentially of two nonconsumable electrodes between which a D.C. arc is passed. A stream of gas when passed through the arc is heated to very high temperatures. The gas becomes ionized and as the available data in the literature or high temperature systems suggest, and as found in the present invention, there are a great variety of unusual and reactive molecular species produced. The species are available for recombination according to energy phase distribution. The temperature of the gas stream will depend on the rate of gas flow and power input to the arc, but the normal operating temperature is such that the gas stream is completely ionized. The unit used for the present invention can produce gas temperatures as high as 15,000° C.

Any gas can be used in the plasma but it is preferred to use a less reactive gas to reduce electrode erosion. The gases normally used are argon, helium, hydrogen and nitrogen. Conveniently, nitrogen, which is also a reactant, could be used for the plasma in trying to prepare nitrogen trifluoride. The thermal cleavage of nitrogen does not proceed at a practical rate below about 1000° C. and this temperature therefore represents the minimum operating temperature. The pyrolysis temperature can be as high as can be obtained by practical means. Temperature of the order of 8000° to 12,000° C. or even higher can be achieved by means of an electric arc.

Apparatus of any suitable design can be used to carry out the process of this invention. In order that the process may be more fully understood, attention is directed to the accompanying drawing which is a diagrammatic representation of an arrangement of apparatus for carrying out the process of this invention. In this diagram 1 and 2 represent fluorine and nitrogen supply lines respectively, with their conventional control devices and flow meters. The nitrogen gas enters the arc chamber designated as 3. The arc is struck between the tip of the cathode 3a and the inside wall of the hollow cup-shaped anode 3b. The ionized gaseous nitrogen passes through a narrow annular space formed by the walls of the anode and into a copper reactor 4 fastened to the generator 3 by means of a lead gasket 3c. The material of construction for the reactor may be of a material which is heat resistant and essentially non-reactive with the starting materials and products, e.g., nickel, Monel metal (registered trademark), copper, Hastelloy metals (registered trademark), stainless steel, or platinum. Of these, copper is designated in the drawing. The reaction zone is located in the copper tube. Pyrolysis takes place in annular space between the cathode and anode, which is heated uniformly by the arc to a temperature estimated to be about 8000°–12,000° C. The body of the arc chamber and the reactor are surrounded with an enclosure which allows water cooling; this is eliminated from the drawing for the sake of simplification.

The fluorine gas, which has been made hydrogen fluoride free by passing through a bed of sodium fluoride, is metered into the reactor 4 by means of a number of holes 4a drilled either linearly along the tube or preferably peripherally around the tube as near as possible to the arc chamber-copper reactor joint. This is desired as opposed to subjecting a gas mixture of nitrogen-fluorine to the plasma arc in which excessive corrosion of the electrode, usually of tungsten, will occur. After the gases are mixed and react in the copper tube they flow into the cold trap 5 where they are quenched to less than room temperature. The gases are then collected in gas samplers and analyzed.

The arc electrodes should be constructed of a suitable metal such as copper, nickel, tungsten, and the like. In the present invention tungsten is the preferred material of construction for the electrodes.

The mole ratio of nitrogen to fluorine must be greater than 0.4. At ratios less than 0.4 ($F_2/N_2$), yields of both nitrogen trifluoride and dinitrogen tetrafluoride are negligible. As the ratio is increased some dinitrogen tetrafluoride is formed. When the mole ratio reaches 1:1 an appreciable amount of nitrogen trifluoride is obtained. As the ratio of fluorine to nitrogen is increased still more, the amount of dinitrogen tetrafluoride disappears and only nitrogen trifluoride is obtained.

The power input to the tungsten electrodes should be such that the temperature of the plasma jet is about 5000° to 12,000° C. The preferred temperature is about 8000° C. Current intensities in the range of 150 to 600 amperes were generally used with the voltage about 30 to 75 volts.

The rate of quenching of the hot exit gases is very important in obtaining good yields. The necessary quenching can be achieved in various ways. For example, as depicted in the drawing, the off-gas upon leaving the hot reaction tube is made to pass over the outside wall of a suitable vessel containing a cooling material. Water, solid carbon dioxide or liquid nitrogen may be used as coolants. The cooling vessel should be a short distance from the reactor to effect the maximum cooling rate. In the equipment used for the present invention the quench rate was approximately 200,000–300,000° C. per second.

It is obvious to those skilled in the art that the residence time of the gases within the hot reaction zone should be sufficiently short so as to minimize side reactions resulting from the decomposition of the nitrogen fluorides formed. The residence time depends, in part, on the design of the system and on the pressures within the system. Therefore it can be stated that, in general, the residence time should not exceed ten seconds. Preferably, the residence time should be less than two seconds and it is convenient to operate it as short as 0.01 second.

The gaseous reaction product coming from the hot zone is quenched rapidly to below room temperature, as already mentioned. The reaction product after quenching is passed into a gas sampling burette for transfer to infrared cells and subsequent analysis. The two nitrogen-fluorides can be differentiated by infrared analysis.

The invention is illustrated in greater detail by the following examples.

Example 1

The source of heat was an electric arc of the type described in the specifications above. The cathode and anode were of tungsten metal. The anode had an opening of 0.187 inch through which the ionized plasma jet entered the copper reactor. The housing of the arc chamber was water cooled as well as the housing of the copper reactor. The copper reactor was 18 inches long. The arc was operated at 40 volts and 300 amperes to obtain a plasma temperature of approximately 8000° C.

A stream of high purity nitrogen was fed into the plasma arc at a rate of 0.50 s.c.f.m. (standard cubic feet per minute). The nitrogen gas was heated to 8000° C. in the arc chamber. The nitrogen then passed through the hollow anode into the copper pipe reactor. Fuorine gas, freed from hydrogen fluoride by passing through a bed of sodium fluoride, was introduced into the copper reactor near the joint with the plasma arc chamber at the rate of 0.5 s.c.f.m. The purified fluorine mixed with the nitrogen plasma at this point.

The resulting gas stream from the copper pipe reactor was now at about 3500° C. Rapid and efficient quenching to less than room temperature was achieved in the liquid nitrogen cold trap. The cooled gaseous product was lead to a gas collecting burette for analysis or condensed to the liquid state in further cold traps. Analysis of the gas by infrared showed a nitrogen trifluoride content of 0.6% and a dinitrogen tetrafluoride content of 0.4%.

Example 2

The heat source was the same as in Example 1. The procedure was the same as Example 1 except that the mole rate of fluorine to nitrogen ($F_2/N_2$) was 2:1. The flow rate of the nitrogen was 0.4 s.c.f.m. and the fluorine rate was 0.8 s.c.f.m. The arc was operated at 50–55 volts and 450 amperes for a resulting plasma temperature of about 12,000° C.

The resulting gas stream from the copper reactor at about 4000° C. was quenched in the liquid nitrogen trap and gas samples collected for infrared analysis. Infrared analysis of the sample showed a nitrogen trifluoride content of 1.7%; no dinitrogen tetrafluoride was detected.

Various changes and modifications may be made in the process described herein as will be apparent to those skilled in the chemical arts. It is accordingly intended that the present invention shall only be limited by the scope of the appended claims.

We claim:

1. A process for preparing a compound of the group consisting of dinitrogen tetrafluoride and nitrogen trifluoride which comprises contacting elemental fluorine gas with a nitrogen plasma at a temperature of at least 1000° C. for a contact period of 0.01–10.0 seconds and cooling the resulting gaseous reaction product to a temperature below 25° C. within a maximum of 1/20 second.

2. The process of claim 1 in which the plasma temperature is about 5000° to 12,000° C.

3. The process of claim 1 wherein said contact period is 0.01–2.0 seconds.

References Cited by the Examiner

UNITED STATES PATENTS

| | | | |
|---|---|---|---|
| 2,972,519 | 2/1961 | Lipscomb | 23—205 |
| 3,121,675 | 2/1964 | Case | 204—171 |
| 3,122,416 | 2/1964 | Gould et al. | 23—205 |

JOHN H. MACK, *Primary Examiner.*

R. K. MIHALEK, *Assistant Examiner.*